Figure 1:
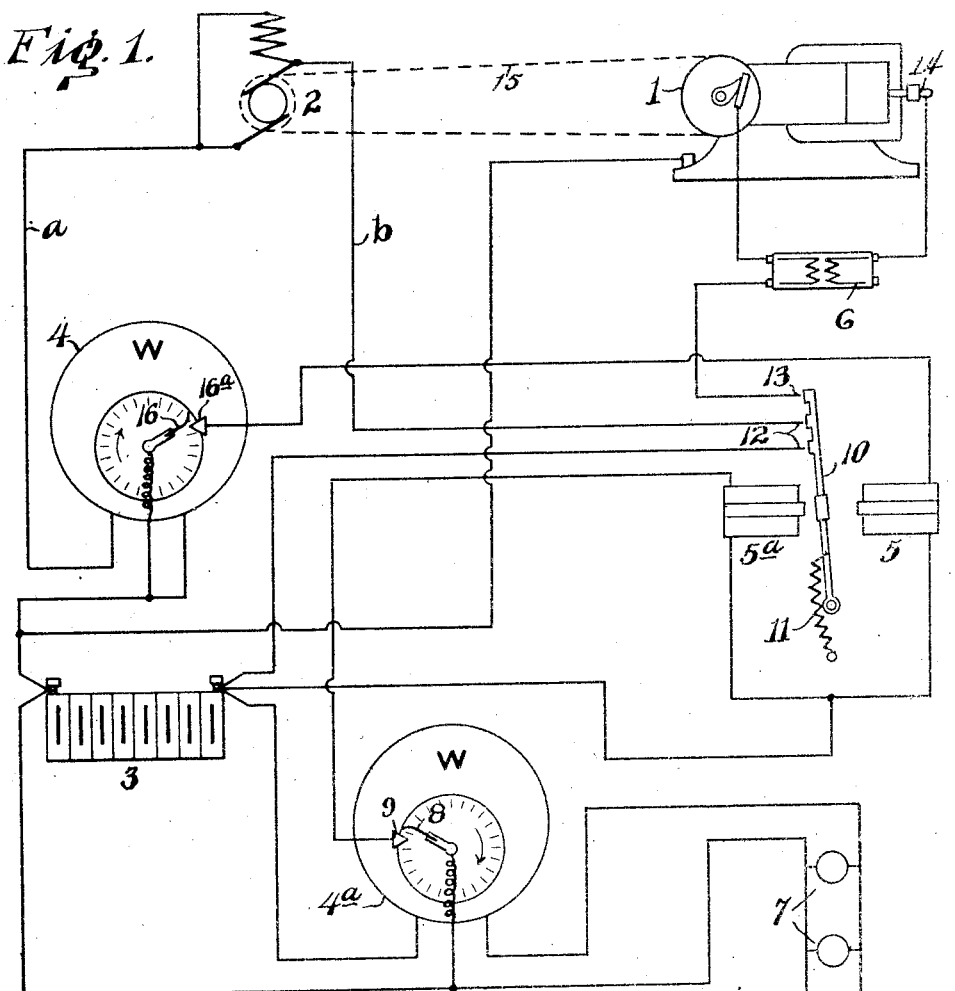

M. A. NEWSTETTER, DEC'D.
W. M. NEWSTETTER, ADMINISTRATOR.
AUTOMATIC ELECTRIC GENERATION SYSTEM.
APPLICATION FILED MAY 20, 1909.

955,985.

Patented Apr. 26, 1910.

Witnesses
Daniel Webster, Jr.
J. O'R. Kelly

Inventor
M. A. Newstetter
by E. A. ... 
Attorney

UNITED STATES PATENT OFFICE.

MALCOLM A. NEWSTETTER, OF READING, PENNSYLVANIA; WILLIAM M. NEWSTETTER ADMINISTRATOR OF SAID MALCOLM A. NEWSTETTER, DECEASED.

AUTOMATIC ELECTRIC-GENERATION SYSTEM.

955,985.  Specification of Letters Patent.  Patented Apr. 26, 1910.

Application filed May 20, 1909. Serial No. 497,300.

*To all whom it may concern:*

Be it known that I, MALCOLM A. NEW-STETTER, citizen of the United States, residing at Reading, in the county of Berks and State of Pennsylvania, have invented certain new and useful Improvements in Automatic Electric-Generation Systems, of which the following is a specification.

This invention relates to an automatic electric generation system (as distinguished from automatic controlling and circuit breaking systems) using an internal combustion or explosive engine as a prime motive power in connection with a suitable electro-magnetic machine and an electric storage battery or accumulator.

The objects of my invention are not only to provide means for charging the battery (the current from which may be used for any purpose) but to make this means entirely automatic in its operation; also to employ no other prime units to obtain this result other than the units of the plant, viz: the explosive motor, the electro-magnetic machine and the electric storage battery; in other words, to make the above units automatic in their operation and able to care for themselves, without the assistance of an attendant, starting, of course, with the battery at least partially charged.

A further object is to provide an arrangement wherein the battery is always connected to the circuit in the building where the current is to be used.

In connection with the above mentioned prime units, I provide suitable instruments, preferably in the form of ampere hour meters, the operation of which will be dependent on the amount of electricity and the direction of its flow through the meters to control the starting and stopping of the prime motive power.

This system must not be confounded with systems wherein the explosive engine is started by a person and the dynamo started and stopped at suitable times or connected and disconnected with the battery at suitable times, for, in my present system the means for charging the battery and the battery itself are utilized as means for starting the engine to charge the battery. The ignition circuit to the explosive engine is also controlled by the instruments which control the main circuit between the battery and the dynamo after a certain predetermined amount of electricity has passed through the instruments in either direction. I also provide means for keeping the compression of the engine cylinder released until its momentum is sufficient to carry it past the compression point.

A further object is to provide means whereby the said electric storage battery is prevented from discharging below a certain predetermined point without starting the engine and dynamo to replenish the battery and to automatically stop said engine when a certain predetermined amount of electricity has passed into the battery.

The invention is more fully described in the following specification and clearly illustrated in the accompanying drawing, in which:—

Figure 2:
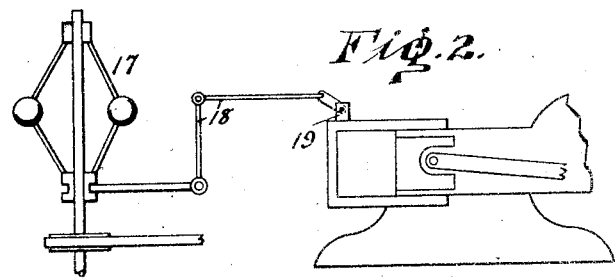

Figure 1 is a diagram of my system. Fig. 2 shows the compression releasing apparatus for the engine.

The numeral 1 designates the explosive engine: 2 is the electro-magnetic machine; 3 the storage battery; 4 and $4^a$ represent ampere hour meters; 5 and $5^a$ the magnets: 6 is the ignition coil and 7 the lights or equivalent.

Assuming that a certain predetermined amount of electricity has passed from the battery to the circuits where the current is to be used, the needle 8 on the meter $4^a$ will, when this amount has passed through it, contact with the terminus 9 and energize the magnet $5^a$ by closing the circuit leading from the battery to said magnet through the meter, and this action will cause the said magnet to draw toward it the pivoted arm 10. This arm is provided with a spring 11 so placed that it will keep the arm in either position placed by the magnets. When this arm moves toward the magnet $5^a$ the free end will contact with the terminals 12 of the main circuit and close said circuit; simultaneously with said action, the arm will also contact with the terminal 13 of the ignition circuit and produce the initial spark in the combustion chamber of the engine to which it is connected at the spark plug 14. It will be seen that in this manner the electro-magnetic machine will first operate as a motor, and inasmuch as it is connected by a belt 15 with the engine, it will start the said engine and permit it to draw a charge and begin its action. When the engine has thus been started, it in turn will give motion to the electro-magnetic machine through the same belt connection, and thus convert it into a dynamo (i. e. the source of electric current) and this dynamo will begin to charge the battery.

It is a positive fact, though perhaps not universally understood, that a shunt wound machine runs either as a dynamo or a motor without changing direction of rotation or changing armature or field connections, and this feature is peculiar to the shunt wound machine.

When a certain predetermined amount of electricity has passed through the meter 4, to the battery, the needle 16 on the meter will contact with the electric terminus 16ᵃ on the meter and energize the magnet 5 to which it is connected. This action will cause said magnet to draw the arm 10 away from the magnet 5ᵃ and toward the magnet 5 and break the contacts at 12 and 13 and thus stop the engine.

In Fig. 2 I have shown how the compression is released in the engine cylinder. In this view the numeral 17 designates the governor, connected by a crank arm and rod 18 to a pet cock 19 in the engine cylinder. When the engine begins to move, there would not, with the cock closed, be sufficient power to draw and compress the first charge. In this construction the cock is open and remains so until the engine gains sufficient speed to throw out the governors which also, through the crank arm and rod 18 will close the pet cock 19 and by that time the engine has also gained sufficient speed or momentum to draw and compress its charge.

It is evident that my system comprises an automatic means for operating a plant of the class described, as the circuit for starting the engine through which the battery is charged by means of the electro-magnetic machine, is automatically closed after a certain predetermined amount of electricity has passed through the meter 4; and in like manner the circuit by means of which the engine is stopped, is automatically closed when a certain predetermined amount of electricity has passed through the meter 4 into the battery.

What I claim is:—

1. In an automatic electric generation system, an explosive engine, an electro-magnetic machine, and an electric storage battery means for completing a circuit between the electro-magnetic machine and the battery and electrically connected instruments controlled by the direction of flow and amount of electricity for starting and stopping the engine.

2. In an automatic electric generation system, a prime motor, an electric storage battery, a generator for charging the battery, a work circuit, an instrument responsive to the amount of current discharged to the work circuit, an instrument responsive to the amount of current that has entered the battery and means controlled by said instruments for starting and stopping the motor.

In testimony whereof I affix my signature, in presence of two witnesses.

MALCOLM A. NEWSTETTER.

Witnesses:
Ed. A. Kelly,
Elmer W. Dion.